US006260576B1

(12) United States Patent
Allen

(10) Patent No.: US 6,260,576 B1
(45) Date of Patent: Jul. 17, 2001

(54) FLUSH VALVE DIAPHRAGM WITH FILTER

(75) Inventor: Charles S. Allen, Kenilworth, IL (US)

(73) Assignee: Sloan Valve Company, Franklin Park, IL (US)

( * ) Notice: Subject to any disclaimer, the term of this patent is extended or adjusted under 35 U.S.C. 154(b) by 0 days.

(21) Appl. No.: 09/579,233

(22) Filed: May 30, 2000

(51) Int. Cl.[7] .............................. F16K 31/385; E03B 7/07
(52) U.S. Cl. .............................................. 137/550; 251/40
(58) Field of Search ................................. 137/550, 544; 251/40

(56) References Cited

U.S. PATENT DOCUMENTS

| | | | |
|---|---|---|---|
| 2,776,812 | * 1/1957 | Colendar | 251/40 |
| 2,916,251 | * 12/1959 | Butts | 251/40 |
| 3,279,742 | * 10/1966 | Billeter | 251/40 |
| 4,261,545 | * 4/1981 | Allen | 251/40 |
| 4,327,891 | * 5/1982 | Allen et al. | 251/40 X |
| 5,213,305 | * 5/1993 | Whiteside et al. | 251/40 |
| 5,332,192 | * 7/1994 | Whiteside | 251/40 |
| 5,335,694 | * 8/1994 | Whiteside | 251/40 X |
| 5,881,993 | * 3/1999 | Wilson et al. | 251/40 |
| 5,887,848 | * 3/1999 | Wilson | 251/40 |
| 5,967,182 | * 10/1999 | Wilson | 137/544 |
| 6,182,689 | * 2/2001 | Lauer et al. | 137/550 |

* cited by examiner

Primary Examiner—John Rivell
(74) Attorney, Agent, or Firm—Cook, Alex, McFarron, Manzo, Cummings & Mehler, Ltd.

(57) ABSTRACT

A diaphragm-type of flush valve for use with toilet devices such as urinals and water closets includes a body with an inlet and an outlet and there is a valve seat therebetween and a valve member movable to a closing position on the valve seat. The valve member includes a diaphragm which is peripherally attached to the body. There is a pressure chamber above the diaphragm for holding the valve member on its valve seat and there is a filter and a bypass orifice connecting the inlet and the pressure chamber. There is a downwardly-facing peripheral recess on the underneath side of the diaphragm, which recess is located generally intermediate the diaphragm outer periphery and the valve seat. A bypass orifice is formed in the diaphragm in alignment with and communicating with the recess. There is a filter ring positioned within the recess and in fluid communication with the water inlet. The filter ring has a multitude of small passages therein which connect the inlet and the bypass orifice.

14 Claims, 2 Drawing Sheets

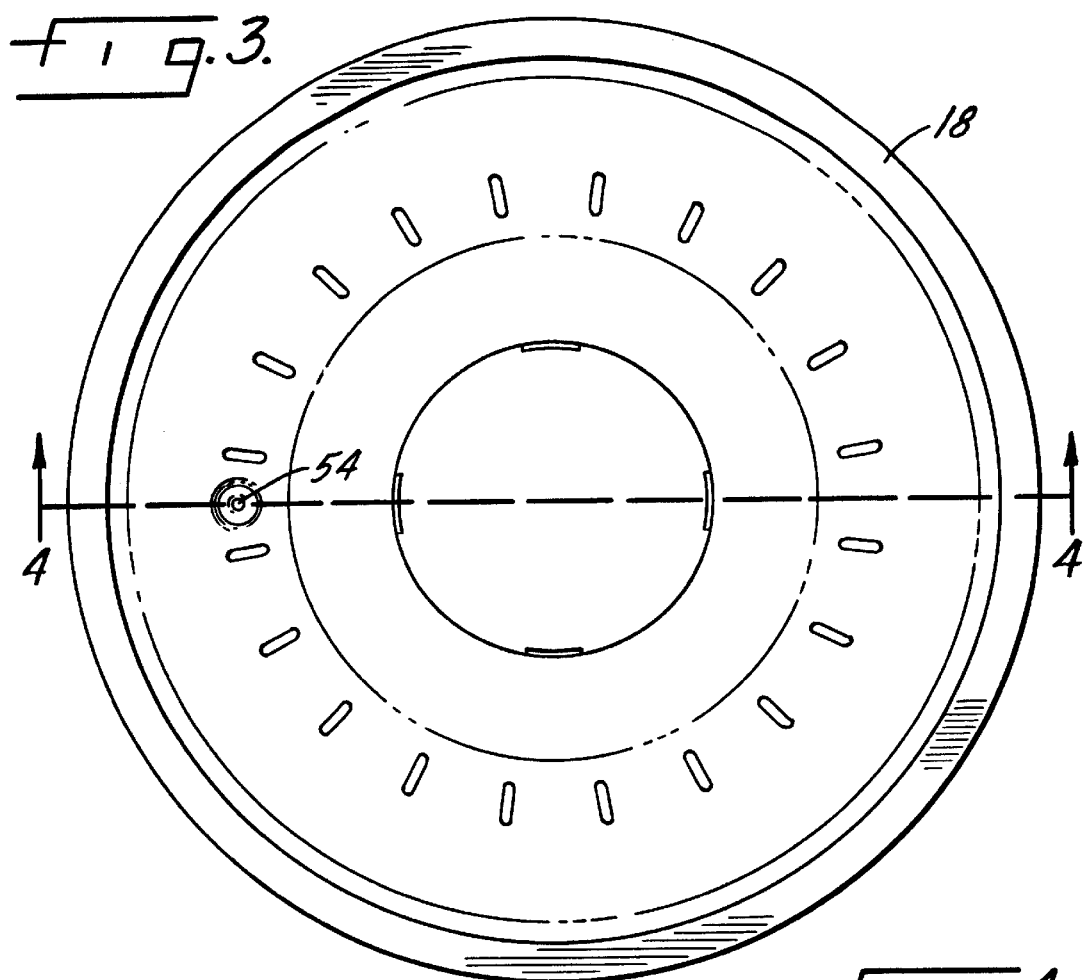
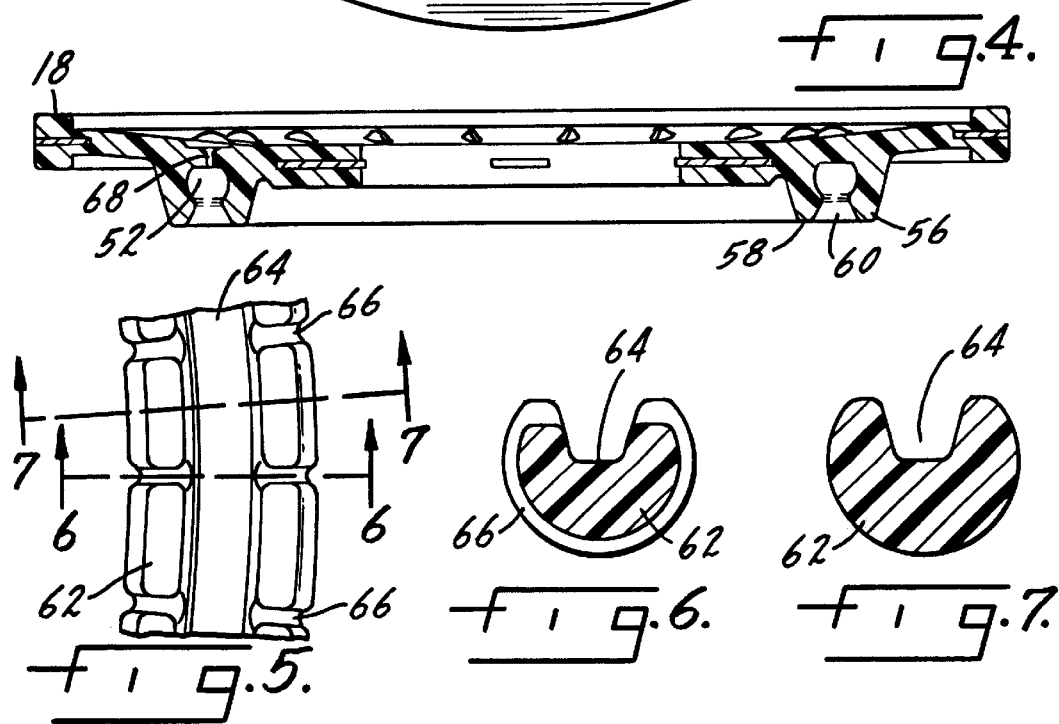

FLUSH VALVE DIAPHRAGM WITH FILTER

THE FIELD OF THE INVENTION

Diaphragm-type flush valves for use on toilet devices such as urinals and water closets have conventionally had a filter and a bypass orifice to connect the flush valve inlet with the pressure chamber above the diaphragm. The purpose of the filter and the bypass is to provide a water passageway of limited size to permit the pressure chamber to fill, insuring closure of the flush valve by movement of the diaphragm onto its valve seat. There have been numerous prior art disclosures relating to the filter and the diaphragm. Such disclosures include U.S. Pat. Nos. 5,213,305, 5,332,192, 5,887,848 and 5,967,182, all assigned to Sloan Valve Company of Franklin Park, Ill., the assignee of the present application. The prior art listed in such patents also show many forms of diaphragm filters and bypass orifices.

The present invention is specifically directed to an improvement in the filter and bypass portion of the diaphragm and more specifically to an improved diaphragm assembly which places the filter and the bypass orifice generally intermediate to the diaphragm periphery and that portion of the diaphragm which closes upon the flush valve seat. The filter includes a filter ring which is positioned within a downwardly-facing recess in the dynamic portion of the diaphragm, with the filter ring having a plurality of small passages connected to a peripheral or circumferential trough. The trough faces upwardly within the diaphragm recess and the orifice is formed within the body of the flexible diaphragm in alignment with the recess. The dynamic movement of the flexible diaphragm will insure that the orifice is self-cleaning. The simply constructed filter ring and its location and attachment to the diaphragm provides a low-cost, efficient and reliably operable filter and orifice to insure continued and consistent operation of the flush valve.

SUMMARY OF THE INVENTION

The present invention relates to flush valves for use on urinals and water closets and more specifically to an improved valve assembly therefor.

A primary purpose of the invention is a diaphragm assembly for the use described, including an improved filter and bypass orifice.

Another purpose of the invention is to provide a diaphragm having a self-cleaning orifice and a filter ring associated therewith which is located generally at the dynamic portion of the flexible diaphragm.

Another purpose of the invention is to provide a reliable, low cost and efficient diaphragm assembly for use in a flush valve of the type described.

Another purpose of the invention is an improved diaphragm assembly for a toilet flush valve, with the diaphragm having a downwardly facing peripheral recess in which is positioned a filter ring having multiple passages which connect the flush valve inlet with an orifice in the diaphragm located in alignment with its recess.

Other purposes will appear in the ensuing specification, drawings and claims.

BRIEF DESCRIPTION OF THE DRAWINGS

The invention is illustrated diagrammatically in the following drawings wherein:

FIG. 3 is an enlarged top view of the diaphragm;

FIG. 4 is a section along plane 4—4 of FIG. 3;

FIG. 5 is an enlarged partial top view of the filter ring;

FIG. 6 is a section along plane 6—6 of FIG. 5; and

FIG. 7 is a section along plane 7—7 of FIG. 5.

DESCRIPTION OF THE PREFERRED EMBODIMENT

Figure 1:
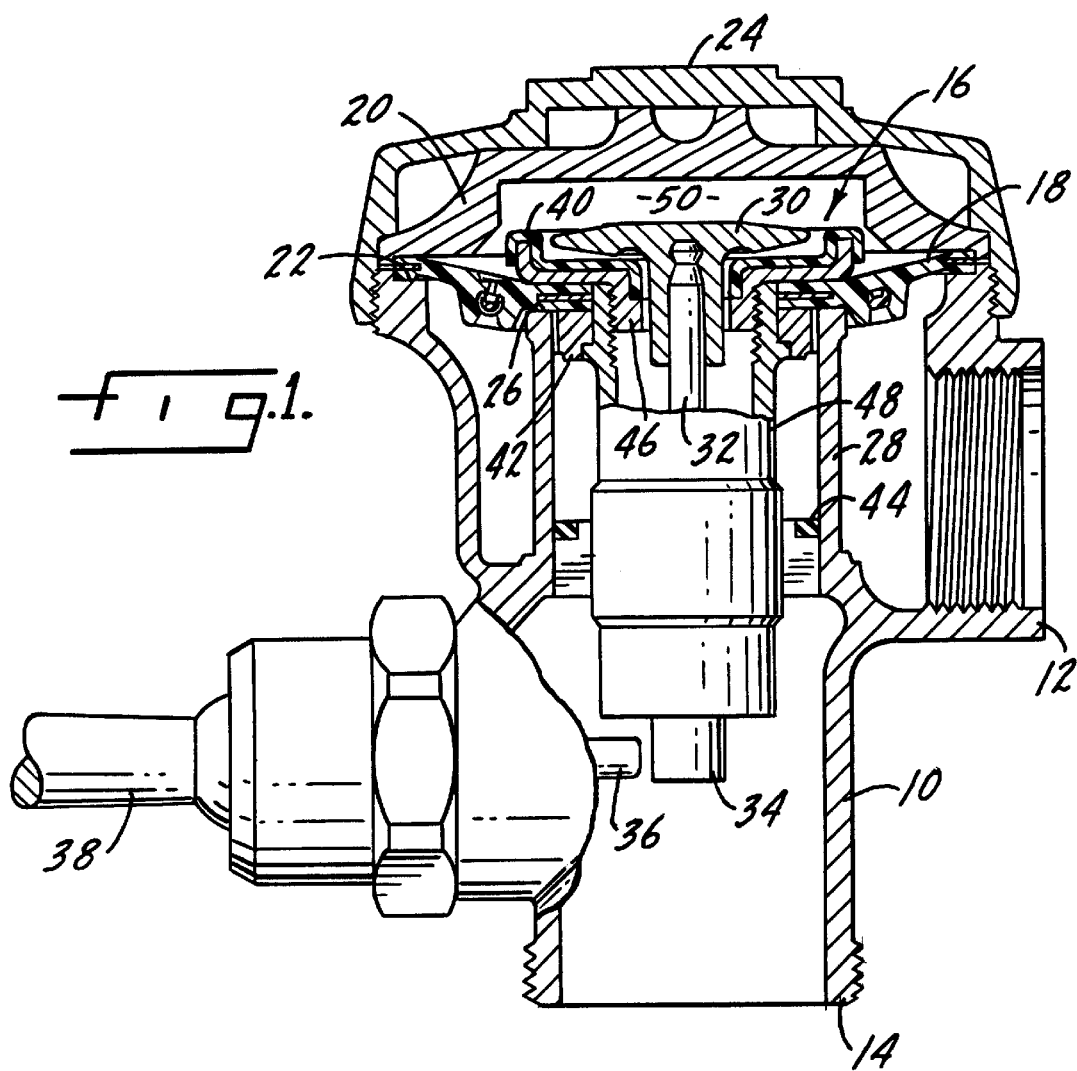
FIG. 1 is a side view, in part section, illustrating a flush valve of the present invention.

The present invention describes a diaphragm assembly for a flush valve. The diaphragm assembly includes the conventional rubber or rubberlike member with a filter ring attached to the underside generally intermediate the outer periphery of the diaphragm and that portion of the diaphragm which closes upon the flush valve seat. There is an orifice in the diaphragm in alignment with the filter ring, with both the ring and the orifice being located generally at the dynamic portion of the flexible diaphragm. The diaphragm assembly will be shown in connection with a flush valve of the type manufactured by the assignee of the present application, Sloan Valve Company, of Franklin Park, Ill., and sold under the trademark ROYAL. The invention should not be so limited, as it has equal application in other types of diaphragm flush valves.

The flush valve includes a body 10 having an inlet connection 12 and an outlet connection 14. A diaphragm assembly indicated generally at 16 includes a diaphragm 18 peripherally held to the body by an inner cover 20. The diaphragm is seated upon a shoulder 22 at the upper end of body 10 and is clamped in this position by the inner cover 20. An outer cover 24 is screwthreaded onto the body to hold the inner cover in position.

The diaphragm assembly 16, as shown in FIG. 1, is closed upon a valve seat 26 formed at the upper end of a barrel 28. The barrel 28 forms the conduit connecting the valve seat with outlet 14. The diaphragm assembly includes a relief valve 30 having a downwardly-extending stem 32 carrying a movable sleeve 34. Sleeve 34 is positioned for contact by a plunger 36 when operated by a handle 38, as is conventional in the operation of flush valves of the type described.

The diaphragm assembly 16, in addition to diaphragm 18 and the relief valve 30, includes a retaining disc 40, a refill ring 42, and a flow control ring 44. The retaining disc 40 is attached to a collar 46 which in turn is threadedly attached at its exterior to a sleeve 48 which carries the refill ring 42. The above-described assembly of elements firmly holds the diaphragm 18 between the upper face of the refill ring 42 and a lower facing surface of the collar 46. Above the diaphragm assembly 16 is a pressure chamber 50 which forces the diaphragm assembly in a closed position when the flush valve is not in use.

As is known in the art, when the handle 38 is operated, the plunger 36 will contact sleeve 34, lifting the relief valve 30 off of its seat on the retaining disc 40. This will permit the discharge of water within the pressure chamber 50 down through the sleeve 48. Inlet pressure will then cause the diaphragm to move upwardly off of its seat 26, permitting direct communication between the inlet 12 and the outlet 14 through the space between the bottom of the diaphragm assembly 16 and the seat 26. As soon as this operation has taken place, the pressure chamber 50 will begin to fill through the to-be-described filter and bypass orifice in the diaphragm assembly. As flow continues into the pressure chamber 50, the diaphragm assembly will move toward its valve seat and when it has reached that position, the flush valve will be in a closed position. It is important that the time period for which the flush valve is open be tightly controlled so that the volume of water which passes through the valve in a single flushing operation can be held to the close tolerances required by the various state and federal regulations in place at the present time.

The diaphragm 18 is formed of a flexible elastomeric rubberlike material. It flexes during use. Generally midway between the outer periphery of the diaphragm where it is held to the flush valve body, and where it closes upon the valve seat 26, there is a downwardly facing recess 52 formed in the underside of the diaphragm. The recess 52 is annular and is in communication with a bypass orifice 54, directly in alignment with the recess. The bypass orifice is formed as the diaphragm is molded, and since the location of the recess and the orifice are in the dynamic portion of the flexible diaphragm, the orifice will be self-cleaning as the diaphragm flexes during use.

At the underside of the recess 52 there are a pair of inwardly-directed lips 56 and 58 which together define the entrance 60 into the recess 52. Positioned within the recess 52 is a filter ring 62 shown in detail in FIGS. 5, 6 and 7.

Figure 2:
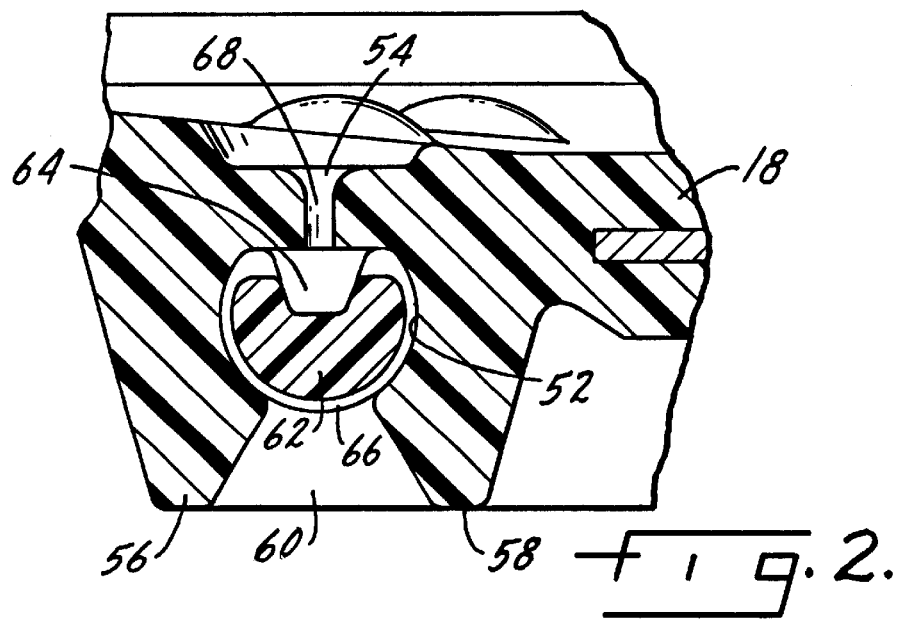
FIG. 2 is an enlarged partial section illustrating a portion of the diaphragm, the bypass orifice, and the filter ring positioned within a recess in the orifice.

The filter ring 62 may be preferably formed of a suitable plastic and is of a size and shape to be located within the recess 52. When the ring is to be inserted, the lips 56 and 58 will be spread as the ring is pushed into the recess 52, and they will be closed back to the FIG. 2 position so as to hold the ring within the recess.

The filter ring 62 has an annular trough 64 which faces upwardly or toward the top of the recess 52 and toward the bypass orifice 54. There are a plurality of passages 66 uniformly spaced about the periphery of the filter ring 62 and each on a radius of that ring. Each of these passages extends around the ring at its particular location so as to form a complete water entrance from the underside of the diaphragm to the trough 64 which connects to the orifice 54. The circumferential extent of each passage 66 and its relation to the trough is shown in FIG. 6.

The width and depth of each passage 66 will be less than the cross sectional size of the restricted portion 68 of orifice 54 so that any particle within the water will be kept away from the orifice by the filter. Thus, the orifice will not be clogged by particles which could be embedded therein, and which particles would have passed the filter other than the size relationship described. In operation, water flowing into the inlet 12 will pass to the filter ring and through the multitude of small passages 66 into the trough 64. The circumferential trough 64 connects with the bypass orifice 54 which in turn opens into the pressure chamber 50. Thus, inlet water reaches the pressure chamber and is used to hold the diaphragm upon its valve seat. Operation of the handle 38, as described above, will remove the relief valve from its seat, venting the pressure chamber and causing the flush valve to operate as described.

Of particular importance in the invention is the location of the filter ring and the fact that the bypass orifice is formed in the flexible material of the diaphragm which imparts to it a self-cleaning characteristic due to flexure of the diaphragm. The assembly is efficient, easy to put together, and reliable in operation and assures a filtered and measured amount of water flowing from the inlet to the pressure chamber.

Whereas the preferred form of the invention has been shown and described herein, it should be realized that there may be many modifications, substitutions and alterations thereto.

The embodiments of the invention in which an exclusive property or privilege is claimed are defined as follows:

1. A diaphragm-type of flush valve for use with toilet devices such as urinals and water closets, including a body having an inlet and an outlet, a valve seat between said inlet and outlet, and a valve member movable to a closing position on said valve seat to control water flow between said inlet and outlet, said valve member including a diaphragm peripherally attached to said body, a pressure chamber above said diaphragm with water therein holding said valve member on said valve seat, a downwardly-facing peripheral recess on the underside of said diaphragm and located generally intermediate the diaphragm outer periphery and the valve seat, a bypass orifice in said diaphragm in alignment with and communicating with said recess, and a filter ring positioned within said recess and in fluid communication with said water inlet, said filter ring having passage means therein to connect said inlet with said pressure chamber, through said orifice, to provide water for said pressure chamber to move said diaphragm to said closing position.

2. The flush valve of claim 1 wherein said filter ring passage means includes a peripheral trough and a plurality of grooves connecting said trough and said inlet.

3. The flush valve of claim 2 wherein said filter ring trough faces toward said diaphragm and toward said diaphragm orifice.

4. The flush valve of claim 2 wherein said plurality of grooves are positioned peripherally about said filter ring and are spaced one from another.

5. The flush valve of claim 4 wherein each of said filter grooves is formed on a line extending radially from the center of said ring and each groove extends circumferentially about said ring.

6. The flush valve of claim 1 wherein said diaphragm is at least in part formed of an elastomeric material and said orifice is formed in said diaphragm, with the configuration of said orifice varying as said diaphragm flexes when moving between open and closed positions in said flush valve.

7. The flush valve of claim 1 wherein said diaphragm includes a pair of peripheral lips forming the underside of said diaphragm recess, with said lips forming an opening for said recess which is smaller in radial dimension than the thickness of said filter ring, whereby said lips hold said ring within said diaphragm recess.

8. A valve member assembly for use in a toilet device flush valve having a valve body and an inlet and an outlet therefor, said flush valve having a seat to close communication between the inlet and the outlet and said valve member assembly being formed and adapted to close upon said seat, said valve member assembly including a diaphragm, a filter and bypass orifice formed in the valve member assembly for use in connecting the flush valve inlet and a flush valve pressure chamber above the valve member assembly to cause movement thereof to a valve closing position, a downwardly-facing peripheral recess on the underside of said diaphragm and located generally intermediate the diaphragm, a bypass orifice formed in said diaphragm in alignment with and communicating with said recess, a filter ring positioned within said recess and in fluid communication with the flush valve water inlet, said filter ring having passage means therein to connect said inlet and said orifice.

9. The flush valve of claim 8 wherein said filter ring passage means includes a peripheral trough and a plurality of grooves connecting said trough and said inlet.

10. The flush valve of claim 9 wherein said filter ring trough faces toward said diaphragm and toward said diaphragm orifice.

11. The flush valve of claim 10 wherein said plurality of grooves are positioned peripherally about said filter ring and are spaced one from another.

12. The flush valve of claim 11 wherein each of said filter grooves is formed on a line extending radially from the center of said ring and each groove extends circumferentially about said ring.

13. The flush valve of claim 8 wherein said diaphragm is at least in part formed of an elastomeric material and said orifice is formed in said diaphragm, with the configuration of said orifice varying as said diaphragm flexes when moving between open and closed positions in said flush valve.

14. The flush valve of claim 8 wherein said diaphragm includes a pair of peripheral lips forming the underside of said diaphragm recess, with said lips forming an opening for said recess which is smaller in radial dimension than the thickness of said filter ring, whereby said lips hold said ring within said diaphragm recess.

* * * * *